May 5, 1925.  
G. P. BALL  
1,536,603  
COMBINATION PORTABLE LOADER AND CAR UNLOADER  
Filed April 11, 1922 3 Sheets-Sheet 3

Witness:
R. E. Weber

Inventor:
George P. Ball
By
Attorneys

Patented May 5, 1925.

1,536,603

UNITED STATES PATENT OFFICE.

GEORGE P. BALL, OF MILWAUKEE, WISCONSIN.

COMBINATION PORTABLE LOADER AND CAR UNLOADER.

Application filed April 11, 1922. Serial No. 551,492.

*To all whom it may concern:*

Be it known that I, GEORGE P. BALL, a citizen of the United States, and resident of Milwaukee, in the county of Milwaukee and State of Wisconsin, have invented certain new and useful Improvements in Combination Portable Loaders and Car Unloaders; and I do hereby declare that the following is a full, clear, and exact description thereof.

The invention relates to a combination portable loader and car unloader.

It comprises a truck provided with a motor for propelling the same, an extensible support carrying a bucket conveyor adapted to be adjusted laterally and depositing material on a belt conveyor, the height of the conveyors being regulatable by the extensible support.

A primary object of the invention is the provision of a device which may be readily and conveniently moved from place to place, the parts of which are capable of ready adjustment in suchwise as to vary the height of either or both of the conveyors and to dispose the bucket conveyor at different distances laterally from the truck. The lateral adjustability of the bucket conveyor makes for convenience in operation, as the material being loaded may be conveyed away from a particular place and it is necessary to move the conveyor to one side in order that more material may be reached. The relationship of the bucket conveyor to the belt conveyor is such that despite the lateral movement of the bucket conveyor, the material is deposited at all times properly on the belt conveyor, which carries it to a convenient unloading point. A primary means for support for the conveyor consists of a guide having a channel bar movable therein. This channel bar may be raised or lowered in the guide by the manual manipulation of a wheel so that the altitude of the conveyors may be readily controlled.

This structure is very advantageous in reaching inaccessible deposits of material, being handy particularly in the unloading of gondola cars, and the arrangement is such that where material is conveyed away from a deposit at a particular altitude, the bucket conveyor may be loaded so that at all times it is in a position for proper and effective operation. The driving means for operating the bucket conveyor is of such nature as at all times to be operative. It accommodates itself to the extension of the channel iron in the guides so that the operator need make no readjustment of the driving means after varying the vertical or lateral position of the bucket conveyor.

An object of the invention is the provision of a structure which is strong and durable, and which is braced especially against transverse stresses.

With the above and other objects in view, which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:

Figure 4 is a horizontal section on the line 4—4 of Figure 1.

Figure 1:
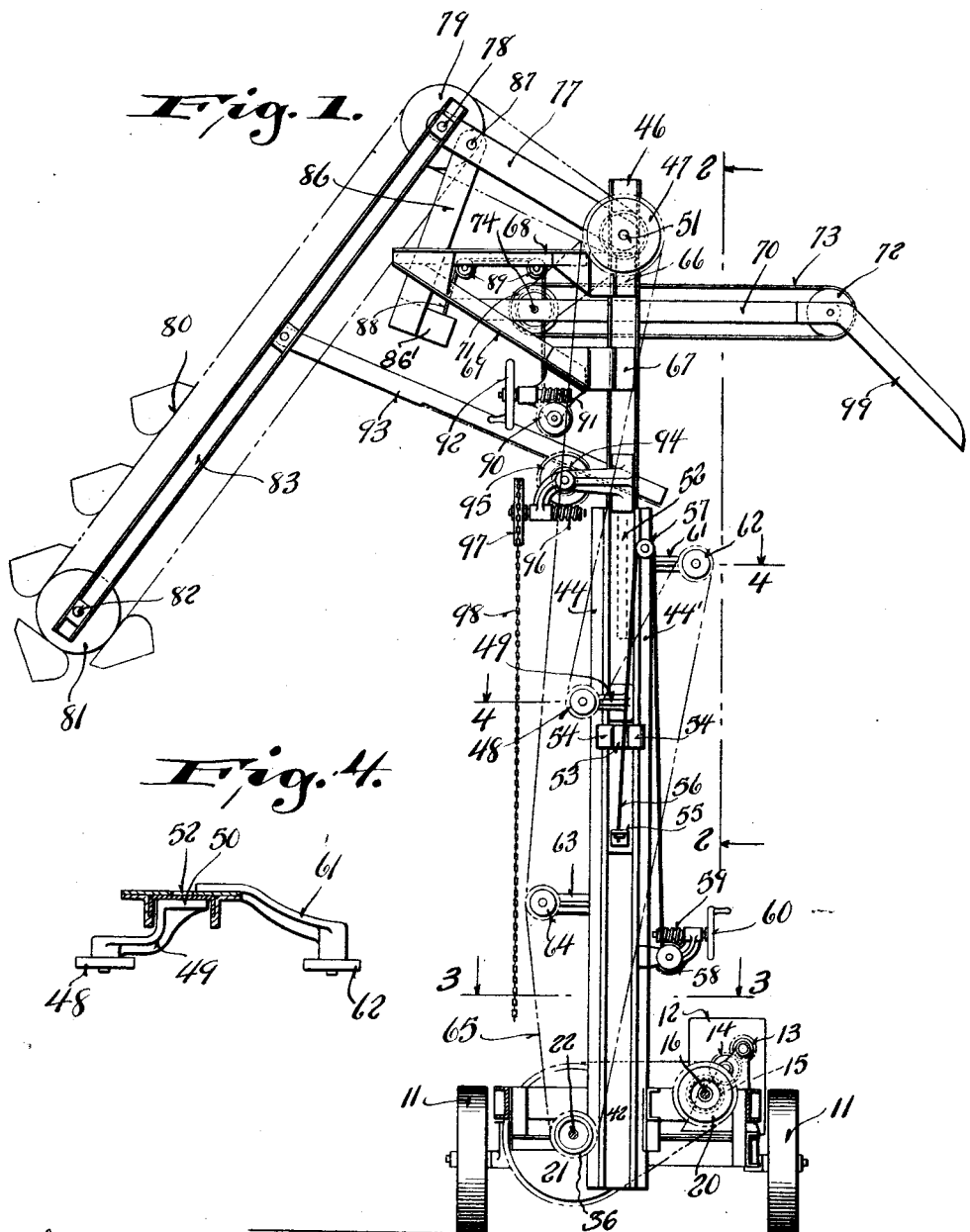
Figure 1 is a side elevation of the invention.
Figure 2:
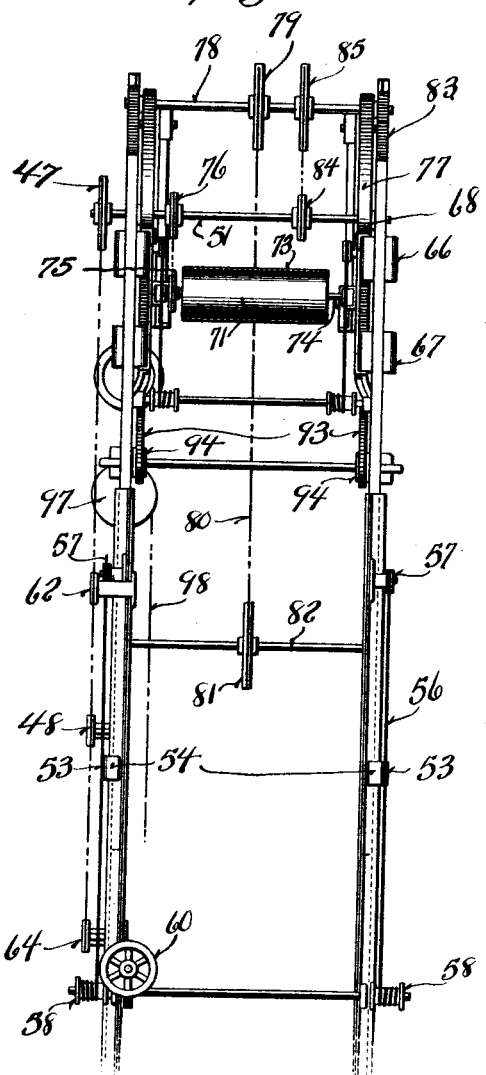
Figure 2 is a cross section on the line 2—2 thereof.

Frame 10 is carried by wheel 11 and supports a motor 12 operating through gears 13, 14, and 15 to rotate the shaft 16 on which a clutch 17 is manually controllable by levers 18 and 19 to drive sprocket wheel 20 connected by a chain to sprocket 21, rigid with shaft 22 carrying the pinion 23, meshing with beveled gears 24 and 25, rotatable on shaft 26 to which sprocket 27 and on which oppositely disposed clutches 28 and 29 are keyed, the clutches having a yoke 30, the lateral positioning of which is controlled through lever 31.

Figure 3:
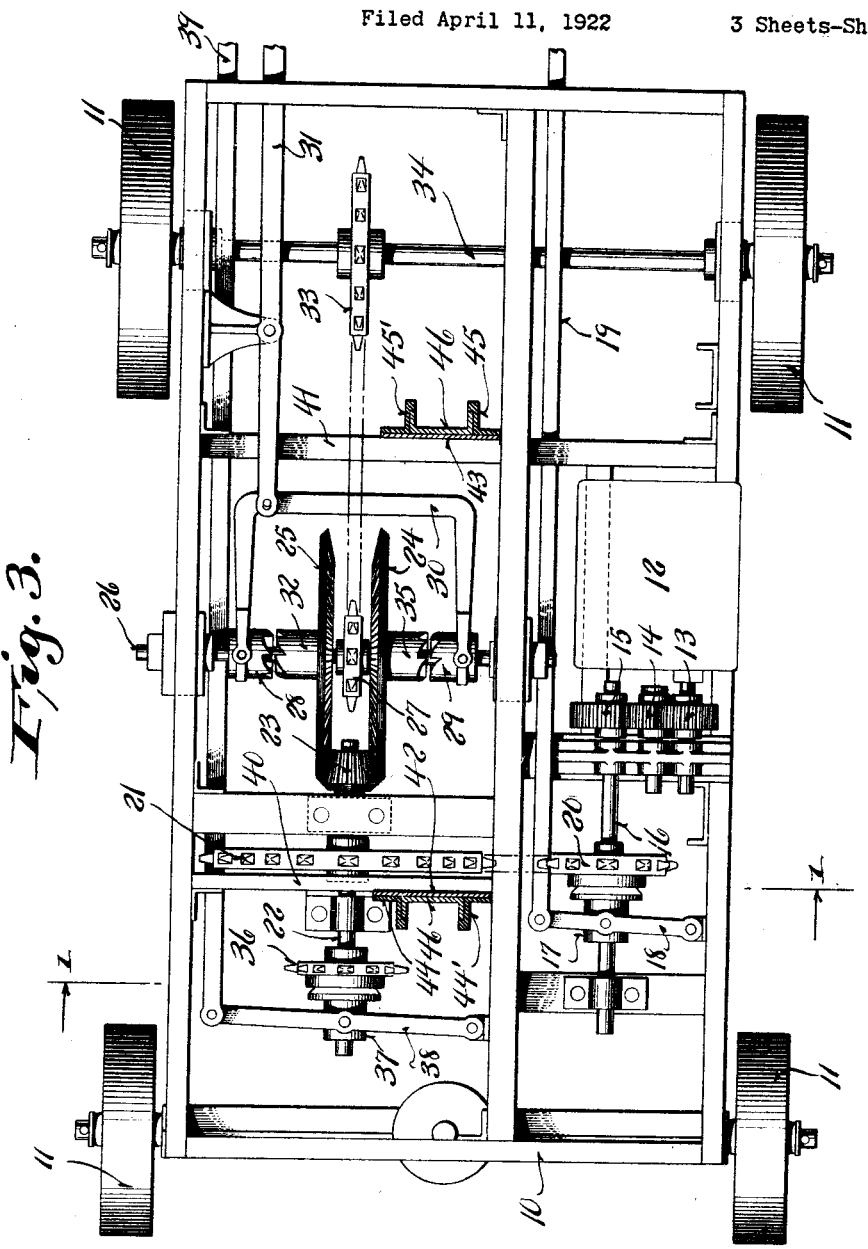
Figure 3 is a horizontal section on the line 3—3 of Figure 1.

In Figure 3 the parts are shown in neutral position. When clutch 28 is in driving relation with sleeve 32 rigid with gear 25, sprocket 27 operates through a chain to drive sprocket 33 and rear axle 34 in one direction. On the movement of clutch 28 away from sleeve 32 by lever 31, clutch 29 may be thrown in engagement with sleeve 35 rigid with beveled gear 24, the direction of rotation of axle 34 being reversed so that the truck may be moved from place to place. Sprocket 36 on shaft 22 may be thrown in or out of operation by clutch 37 controlled by lever 38 and link 39.

Secured to frame 10 are spacers 40 and 41 secured to plates 42 and 43, with which guides 44—44' and 45—45' are rigid. Channel irons 46 are slidable in the guides. Channel iron 46 carries sprocket 47 at its top and a sprocket 48 at the bottom, sprocket 48 being supported on a bracket 49 provided with a foot 50 rigid with the channel iron, the bracket being of such shape as not to interfere with the extension of the channel iron in the guides. Sprocket 47 is mounted on a shaft 51 and plate 42 is provided with a slot 52 shown in Figure 4 and in dotted lines in Figure 1, the slot receiving shaft 51 when the channel iron 46 is moved downwardly. A traveler 53 is rigid with channel iron 46 and provided with grips 54 movable on guides 44—44'. The traveler operates in the extreme elevated position of the channel iron to prevent distortion of plate 42, which is weakened by slot 52. The channel iron is provided with a lug 55 from which a cable 56 extends upwardly over a sheave 57 supported on guide 44', whence it leads downwardly to drum 58 which is rotatable by worm 59 and wheel 60, the winding of the cable on drum 58 lifting channel bar 46.

Plate 42 carries bracket 61, supporting sprocket 62 and bracket 63, similar in shape to bracket 61, and supporting sprocket 64. A chain 65 extends about sprockets 36, 64, 47, 48, and 62 so that a tensioning means of driving sprocket 47 is provided and this means is operative in spite of the extension of channel iron 46 in guides 44—44' so that the elevation of channel iron 46 is concomitant with an automatic adjustment of the driving means or chain 65, whereas the upward movement of sprocket 47 tends to tension the chain 65, the upward movement of sprocket 48 tending to release the tension so that the movement is compensated and at all times an effective driving action is exerted through sprocket 36.

Channel irons 46 carry, also, brackets 66 and 67 similar in shape to bracket 49, so as to move particularly between guides 44—44'. Brackets 66 carry frame members 68 and brackets 67 carry frame members 69, the frame members on each side of the device being secured together so that a pair of frames is provided carried by each channel iron 46. Secured to frame member 69 are transverse supports 70 having rollers 71 and 72 on which belt conveyor 73 travels, roller 71 being rigid with shaft 74 driven by sprocket 75 connected by a chain to sprocket 76, rigid with shaft 51, rotatable by sprocket 47.

On shaft 51 links 77 are pivoted connecting with a shaft 78 having a wheel sprocket 79 from which an endless bucket conveyor 80 extends downwardly to wheel 81, rotating on shaft 82, shafts 82 and 78 being journalled in channel iron 83. Sprocket 84 rigid with shaft 51 transmits power through a chain to sprocket 85 rigid with shaft 78, so that a tension driving means is provided for pulley 79. This driving means is operative despite angular movement of link 77, rotating on shaft 51. Means are provided for moving link 77 upwardly, consisting of a bar 86 pivoted at 87 to the link 77 and provided with an offset portion 86' at its lower end. This offset portion has attached thereto a cable 88 which passes over the pulleys 89 and to the drum 90, such drum being rotated by means of a worm 91 and hand wheel 92. Obviously when the cable is wound upon the drum, the bar 86 is forced upwardly thus rocking the link 77 about its pivot point. When the cable is unwound the link 77 rocks downwardly and finally rests upon the frame member 68.

The movement of link 77 upwardly varies the vertical adjustment of the bucket conveyor so that there are two distinct means for varying the vertical adjustment of the bucket conveyor. Channel iron 46 is limited in vertical dimension by the fact that its lowermost end will contact if lowered sufficiently with the ground. Consequently a limit to the vertical extensibility of the channel iron occurs. At this point the link 77 is operative.

In order to vary the lateral position of the bucket conveyor, a rack bar 93 is laterally movable by gear 94 rigid with worm wheel 95, rotatable by worm 96 and sprocket 97 from which chain 98 depends to the ground for convenient manual manipulation, so that the operator may readily vary the lateral position of the bucket conveyor. This lateral extensibility of the bucket conveyor is advantageous in adjusting the device to deposits at greater or lesser distances from the truck so that the device is conveniently usable on material located in various places and is operative in spite of comparative inaccessibility of the material to be loaded. The substance is conveyed upwardly by the buckets to traction wheel sprocket 79 and then deposited on belt conveyor 73, which transfers it to chute 99 from which it is unloaded.

It will be observed that wheel 81 may be swung in close to the truck so as to convey away material adjacent wheels 11. The movement laterally of the bucket conveyor pivotally on shaft 78 would swing the lower end of the conveyor upwardly from the ground. To prevent this, channel iron 46 is lowered by rotating wheel 60. The pivotal movement of the conveyor and the lowering of the channel iron 46 may be so proportioned as to maintain the wheel 81 close to the ground as it travels outwardly. Thus the material close to the truck and for a considerable distance away may be completely removed without lateral movement of the truck itself.

I claim:—

1. In a device of the class described, the combination of a telescopic vertical support having an upper elongated member and a lower elongated member with the upper of said members adapted to project above the said lower member, a conveyor operatively carried by the projecting portion of the upper member, means for varying the length of said vertical support, a driving means for said conveyor permanently mounted adjacent the bottom of said lower elongated member, and means maintaining an operative driving connection between said driving means and said conveyor for all telescoping movements of said vertical support.

2. In a device of the class described, the combination of an extensible support having an upper movable member and a lower relatively stationary member, a conveyor operatively carried by the upper member, means for moving said upper member upwardly or downwardly with reference to said lower member, driving means for said conveyor permanently mounted adjacent the bottom of the lower member and comprising a driving pulley, a driven pulley carried by said upper member and operatively connected with said conveyor, an idler pulley carried by said lower member, a corresponding idler pulley carried by said upper member and adapted to move upwardly and downwardly therewith, and a belt passing over said driving pulley and the said driven pulley, said belt being looped between and over said idler pulleys, whereby said belt is retained in a taut driving condition in all positions of adjustment of said upper member relatively to said lower member.

In testimony that I claim the foregoing I have hereunto set my hand at Milwaukee, in the county of Milwaukee and State of Wisconsin.

GEORGE P. BALL.